United States Patent [19]
Scott

[11] Patent Number: 4,776,826
[45] Date of Patent: Oct. 11, 1988

[54] CHAIN SAW DRIVE SPROCKET WITH WEAR MARK INDICATORS

[75] Inventor: Gary Scott, Milwaukee, Oreg.

[73] Assignee: Blount, Inc., Montgomery, Ala.

[21] Appl. No.: 167,537

[22] Filed: Mar. 14, 1988

[51] Int. Cl.$^4$ ............................................. F16H 55/30
[52] U.S. Cl. ...................................... 474/156; 30/381; 83/834
[58] Field of Search .................. 474/156–158, 474/162–165, 902, 152; 83/788, 802, 830, 834; 30/381, 384; 29/159 R; 74/439

[56] References Cited

U.S. PATENT DOCUMENTS

| | | | |
|---|---|---|---|
| 3,059,491 | 10/1962 | Hoff, et al. | 474/156 |
| 3,087,350 | 4/1963 | Reed | 474/156 X |
| 3,099,924 | 8/1963 | Armstrong | 474/156 |
| 3,135,127 | 6/1964 | Reed | 474/156 X |
| 3,491,806 | 1/1970 | Kaisser et al. | 474/157 X |
| 4,593,591 | 6/1986 | Beerens | 83/834 |

*Primary Examiner*—Thuy M. Bui
*Attorney, Agent, or Firm*—Klarquist, Sparkman, Campbell, Leigh & Whinston

[57] ABSTRACT

A saw chain sprocket has wear indicating grooves disposed in the saw chain contacting surface, each groove being located at a predetermined distance from the tip of the saw chain driving tooth such that when the sprocket surface is worn to the depth of one of the grooves, sprocket replacement is indicated as necessary.

7 Claims, 1 Drawing Sheet

CHAIN SAW DRIVE SPROCKET WITH WEAR MARK INDICATORS

BACKGROUND OF THE INVENTION

This invention relates to sprockets for chain saws and more particularly, to a chain saw sprocket that incorporates wear mark indicators to alert the chain saw user to the appropriate time for sprocket replacement.

Heretofore, chain saw sprockets have included no clear means to determine the end of their useful service life. Accordingly, chain saw users have been unsure as to when to replace the chain saw sprocket for optimum service and performance of their machine.

A chain saw sprocket is typically driven by a clutch drum and includes saw chain driving teeth which engage the drive links of a saw chain, thereby to drive the latter around a guide bar. Chain saw sprockets are generally of two types. One type is the spur or open sprocket type wherein a plurality of radially extending teeth are positioned to engage the driving tangs of the saw chain drive links. The other type is known as a rim sprocket. This generally comprises a pair of disc-shaped cylindrical elements or rings having a plurality of pockets formed therebetween which receive the depending drive tangs of the saw chain drive links. A plurality of wedge-shaped teeth are positioned between the rims. The drive tang of a drive link is received in each of the pockets as the sprocket is rotated under power. The undersides of the side links or side plates of the saw chain ride on the rims. Rim sprockets give smoother chain operation and result in less wear and chain damage because the chain is supported on the circular rims.

As a saw chain rides on each of the types of sprockets, wear occurs to the sprocket. Heretofore, there has been no means to indicate to the chain saw user when the sprocket should be replaced.

It is thus the principal object of the present invention to provide a chain saw sprocket with wear mark indicators to let the chain saw user know when the sprocket should be replaced.

A further object of the present invention is to provide such a wear mark indicator in the form of a groove of a selected depth in an area of each sprocket which will be contacted either by the drive tangs of the drive links or by the side links or plates and which groove is positioned to be readily visible to the user.

DESCRIPTION OF PREFERRED EMBODIMENT

Figure 1:
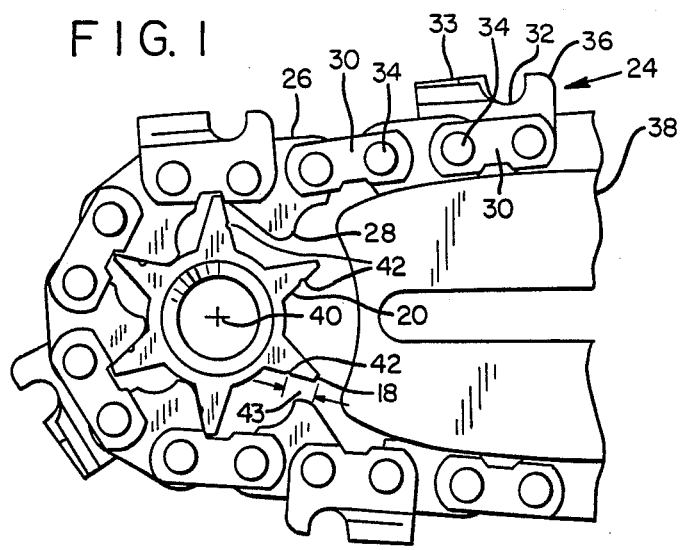
FIG. 1 is a side elevational view of a spur-type of chain saw sprocket illustrated in driving engagement with a saw chain, the sprocket incorporating the wear mark indicators of the present invention.
Figure 2:
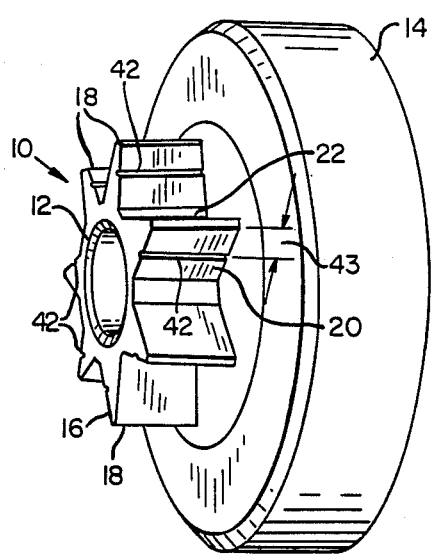
FIG. 2 is a perspective view of the spur sprocket of FIG. 1 illustrated in association with a typical chain saw clutch drum.

Referring to the drawings and particularly to FIGS. 1 and 2, the instant invention is shown incorporated in a spur-type chain saw sprocket 10 shown mounted on a hub 12 of a typical clutch drum 14. Sprocket 10 includes a plurality of saw chain driving teeth 16, each of which has a tip 18, a leading face 20 and a trailing face 22. Faces 20 and 22 are disposed on either side of tip 18. A saw chain 24 is driven by sprocket 10. Saw chain 24 includes a plurality of longitudinally spaced apart center links 26 having sprocket-engaging root portions or drive tangs 28 which are engaged by sprocket 10. Links 26 are pivotally connected together by means of oppositely disposed side links or side plates 30, 32 and rivets 34 forming pivot pins for the various links. Side plates 30 are simple connector plates and all are identical. Side plates 32 are each formed with a hook-shaped tooth 33 on its upper end and each is provided with a depth gauge 36 ahead of the tooth. Saw chain 24 is supported upon a guide bar 38.

Sprocket 10 has an axis of rotation 40. In accordance with the invention a plurality of wear indicating grooves 42 are formed in the leading faces 20 of each tooth 16 of sprocket 10. Each of the grooves 42 is parallel to axis 40. Each groove 42 is of a preselected depth and each is disposed a predetermined distance 43 from the tip 18 of a tooth 16 such that when the surface of leading face 20 is worn to the point that such surface is at the depth of a groove 42, the user is alerted to the fact that sprocket replacement is necessary. I have found that for a ⅜ inch-seven tooth spur sprocket, a groove 0.020 inch in depth and positioned 0.090 inch along leading face 20 from the tip 18 of a tooth 16 is adequate to alert the user to the fact that sprocket replacement is necessary. For spur sprockets typically used in chain saws, grooves varying in depth from about 0.015 inch to 0.030 inch are satisfactory.

Figure 3:
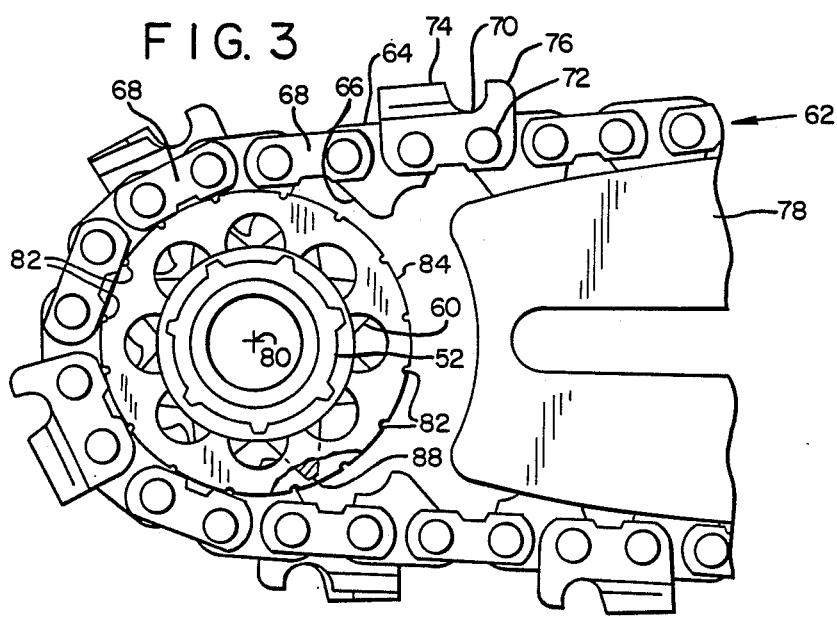
FIG. 3 is a side elevational view of a rim-type of chain saw sprocket illustrated in driving engagement with a saw chain, the sprocket incorporating the wear mark indicators of the present invention.
Figure 4:
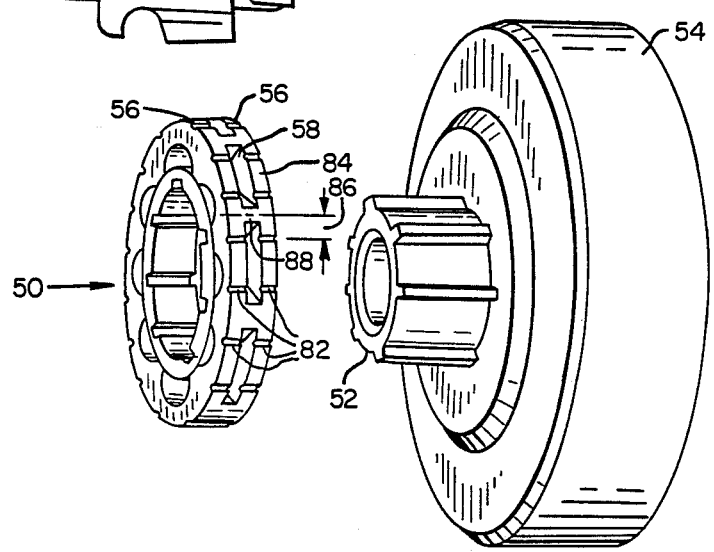
FIG. 4 is an exploded view of the rim-type sprocket of FIG. 3 illustrated in association with the typical clutch drum and splined hub of a chain saw.

FIGS. 3 and 4 illustrate the invention incorporated in a typical rim sprocket 50 shown mounted on a splined hub 52 of a clutch drum 54. Sprocket 50 is typically a unitary structure comprising a pair of disc-shaped cylindrical elements or rims 56 forming pockets 58 therebetween. A plurality of wedge-shaped saw chain driving teeth 60 are positioned between the rims. A saw chain 62 is driven by sprocket 50. Saw chain 62 includes a plurality of longitudinally spaced apart center links 64 each of which has a sprocket-engaging root portion or drive tang 66 which is received in a pocket 58 and which engages a tooth 60 as sprocket 50 is rotated under power. Center links 64 are pivotally connected together by means of oppositely disposed side links or side plates 68, 70 and rivets 72 which form pivot pins for the various links. Again, side plates 68 are simple connector plates and all are identical. Side plates 70 are each formed with a hook-shaped tooth 74 on its upper end and each is provided with a depth gauge 76 ahead of the tooth. Again, saw chain 62 is supported upon a guide bar 78. As can be seen, the undersides of side plates 68, 70 ride on the cylindrical surfaces 84 of rims 56.

Sprocket 50 has an axis of rotation 80. In accordance with the invention a plurality of wear indicating grooves 82 are formed in the cylindrical surfaces 84. Each of the grooves 82 is parallel to axis 80. Each groove 82 is of a preselected depth and each is disposed a predetermined distance 86 from the center of the tip 88 of a tooth 60. The grooves 82 are preferably disposed in pairs, one of each pair leading each tooth 60 and the other of each pair trailing, each groove 82 of the pair being disposed at an equal distance, leading and trailing, from the center of tip 88. When the cylindrical surfaces 84 of rims 56 are worn to the point that such surfaces are at the depth of a groove 82, the user is alerted to the fact that replacement of sprocket 50 is necessary. I have found that for a ⅜ inch-seven tooth rim sprocket, a groove in surfaces 84 of 0.020 inch in depth and positioned 0.150 inch on either side of the center of each tip 88 is adequate to alert the user to the fact that sprocket replacement is necessary. For rim sprockets typically used in chain saws, grooves varying in depth from about 0.015 inch to 0.030 inch are satisfactory.

Having illustrated and described preferred embodiments of the invention, it should be apparent to those skilled in the art that the invention permits modification in arrangement and detail. I claim as my invention all such modifications as come within the true spirit and scope of the following appended claims.

I claim:

1. In a chain saw sprocket having an axis of rotation, a saw chain contacting surface on the sprocket and disposed about the axis, and a plurality of saw chain driving teeth, each of the teeth having a tip, the improvement comprising:

at least one groove disposed in the saw chain contacting surface;

the groove being parallel to the axis of the sprocket;

the groove being of a preselected depth and being disposed a predetermined distance from the tip of a saw chain driving tooth;

the depth of the groove being selected to indicate that replacement of the sprocket is necessary when the saw chain contacting surface is worn such that said surface is at the depth of the groove therein.

2. The chain saw sprocket of claim 1, wherein the improvement comprises at least one pair of grooves, the pair of grooves being disposed in the saw chain contacting surface on opposite sides of the saw chain driving teeth, each of the grooves in the pair being disposed in the surface at an equal distance from the tip of a tooth.

3. The chain saw sprocket of claim 1, wherein the sprocket is a spur sprocket and the saw chain contacting surface is disposed on a tooth thereof, the tooth having a leading and a trailing face disposed on either side of the tip thereof, the groove being disposed in a leading face of the tooth.

4. The chain saw sprocket of claim 3, wherein the depth of the groove in the spur sprocket is between about 0.015 inch and 0.030 inch.

5. The chain saw sprocket of claim 1, wherein the sprocket is a rim sprocket comprising a pair of cylindrical rims having cylindrical surfaces and the saw chain driving teeth are disposed intermediate the rims, the saw chain contacting surface being disposed on the cylindrical surfaces of the rims, the groove being disposed in the saw chain contacting surfaces of the rims.

6. The chain saw sprocket of claim 5, wherein the improvement comprises at least one pair of grooves, each of the pair of grooves being disposed in the saw chain contacting surfaces of the rims on opposite sides of the saw chain driving teeth, each of the grooves in the pair being disposed in the rims at an equal distance from the tip of a tooth.

7. The chain saw sprocket of claim 5, wherein the depth of the groove in the rim sprocket is between about 0.015 inch and 0.030 inch.

* * * * *